(No Model.)

W. L. FERGUSON.
ATTACHMENT FOR CYCLE PEDALS.

No. 493,696. Patented Mar. 21, 1893.

Witnesses

Inventor
William L. Ferguson
By Walter W. Calmore
Attorney

UNITED STATES PATENT OFFICE.

WILLIAM L. FERGUSON, OF PHILADELPHIA, PENNSYLVANIA.

ATTACHMENT FOR CYCLE-PEDALS.

SPECIFICATION forming part of Letters Patent No. 493,696, dated March 21, 1893.

Application filed August 3, 1892. Serial No. 442,020. (No model.)

*To all whom it may concern:*

Be it known that I, WILLIAM L. FERGUSON, a citizen of the United States, residing at Philadelphia, in the county of Philadelphia and State of Pennsylvania, have invented certain new and useful Improvements in Attachments for Cycle-Pedals, of which the following is a specification, reference being had therein to the accompanying drawings.

My invention is an attachment for cycle pedals by the use of which power may be applied to the pedal on the upstroke as well as the down stroke and it consists in certain novel features which will be hereinafter described and claimed.

Figure 1:
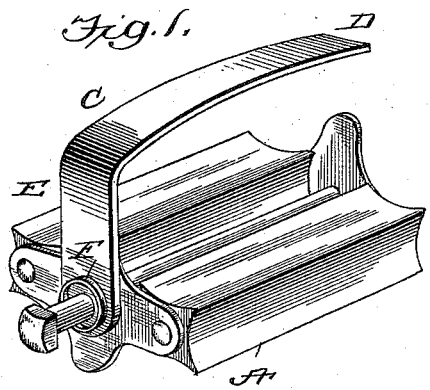
Figure 2:
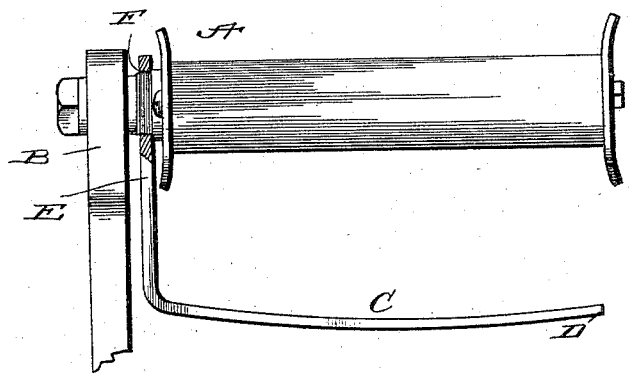
Figure 3:
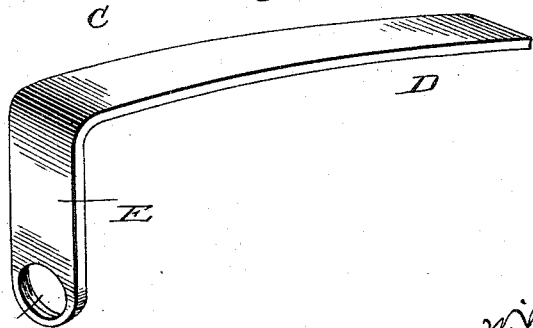

In the annexed drawings, Figure 1 is a perspective view of a pedal showing my improved attachment applied thereto. Fig. 2 is an end view of the pedal showing the attachment in the position it occupies when not in use and Fig. 3 is a detail perspective view of the attachment removed.

The pedal A may be of the usual or any preferred construction and is attached to the crank arm B of the driving shaft in any desired manner. Between the pedal and the crank arm, upon the axle of the pedal, I mount my attachment which consists of a stirrup C formed of a stout L-shaped piece of metal or other suitable material having the arm D which is adapted to extend over the foot of the rider and the arm E depending from the said arm D and provided with an opening F in its lower end through which the axle of the pedal passes.

In practice, when it is desired to use the stirrup, it is swung upward into the position shown in Fig. 1 and will pass over the foot of the rider, as will be readily understood. When the attachment is not in use, it is swung downward into the position shown in Fig. 2 and will remain below the pedal out of the way. The opening F is threaded just sufficiently to cause it to be held firmly when turned downward under the pedal but allowed to play loosely when turned upward. One side of the stirrup, it will be noticed, is open so that if the rider should fall his foot will not be caught and held. It will be seen from the foregoing description that I have provided an extremely simple attachment for cycle pedals which will not add to the weight of the pedal and by the use of which the rider may apply power to the pedal on the upstroke as well as the down stroke.

The exact manner of applying the attachment is immaterial and it may be secured to the frame of the pedal.

Having thus described my invention, what I claim, and desire to secure by Letters Patent, is—

An attachment for cycle pedals consisting of an L-shaped stirrup mounted on the axle of the pedal and adapted to be turned up over the pedal.

In testimony whereof I affix my signature in the presence of two witnesses.

WILLIAM L. FERGUSON.

Witnesses:
HENRY M. TRACY,
ALBERT SCHIMPF.